US008290986B2

(12) United States Patent
Popescul et al.

(10) Patent No.: US 8,290,986 B2
(45) Date of Patent: Oct. 16, 2012

(54) DETERMINING QUALITY MEASURES FOR WEB OBJECTS BASED ON SEARCHER BEHAVIOR

(75) Inventors: Alexandrin Popescul, Mountain View, CA (US); Clifford A. Brunk, Menlo Park, AZ (US); Nadav A. Zimak, Palo Alto, CA (US); Kostas Tsioutsiouliklis, San Jose, CA (US)

(73) Assignee: Yahoo! Inc., Sunnyvale, CA (US)

( * ) Notice: Subject to any disclaimer, the term of this patent is extended or adjusted under 35 U.S.C. 154(b) by 316 days.

(21) Appl. No.: 11/769,641

(22) Filed: Jun. 27, 2007

(65) Prior Publication Data
US 2009/0006357 A1 Jan. 1, 2009

(51) Int. Cl.
*G06F 17/30* (2006.01)
(52) U.S. Cl. ...................................................... 707/798
(58) Field of Classification Search ........................ None
See application file for complete search history.

(56) References Cited

U.S. PATENT DOCUMENTS

| | | | |
|---|---|---|---|
| 4,167,652 A | 9/1979 | Braugenhardt et al. | |
| 5,933,832 A | 8/1999 | Suzuoka et al. | |
| 6,018,619 A | 1/2000 | Allard et al. | |
| 6,070,176 A | 5/2000 | Downs et al. | |
| 6,167,438 A | 12/2000 | Yates et al. | |
| 6,199,081 B1 | 3/2001 | Meyerzon et al. | |
| 6,438,543 B1 | 8/2002 | Kazi et al. | |
| 6,490,575 B1 | 12/2002 | Berstis | |
| 6,493,702 B1 | 12/2002 | Adar et al. | |
| 6,546,388 B1 | 4/2003 | Edlund et al. | |
| 6,591,266 B1 | 7/2003 | Li et al. | |
| 6,728,752 B1* | 4/2004 | Chen et al. ............. | 709/203 |
| 6,751,612 B1 | 6/2004 | Schuetze et al. | |
| 7,003,565 B2 | 2/2006 | Hind et al. | |
| 7,082,426 B2 | 7/2006 | Musgrove et al. | |
| 7,086,002 B2 | 8/2006 | Elo et al. | |
| 7,319,971 B2 | 1/2008 | Abrahams et al. | |
| 7,383,299 B1 | 6/2008 | Hailpern et al. | |
| 7,490,092 B2 | 2/2009 | Sibley et al. | |
| 8,051,105 B1* | 11/2011 | Johnson ................. | 707/798 |
| 2002/0032772 A1 | 3/2002 | Olstad et al. | |
| 2002/0046389 A1 | 4/2002 | Hirakimoto et al. | |
| 2002/0059221 A1 | 5/2002 | Whitehead et al. | |

(Continued)

OTHER PUBLICATIONS

"Query-Log Based Authority Analysis for Web Information Search," by Luxenburger and Weikum, In: Web Information Systems—WISE 2004, pp. 90-101. Available at http://www.springerlink.com/content/yhtq8rfr3fv9t0yd/ Last visited: May 29, 2009.*

(Continued)

*Primary Examiner* — Neveen Abel Jalil
*Assistant Examiner* — Daniel Kinsaul
(74) *Attorney, Agent, or Firm* — Hickman Palermo Truong Becker Bingham Wong LLP (57) ABSTRACT

Techniques are provided for generating quality measures for items, including web pages, based on a "random searcher" behavior model. The random searcher behavior model takes into account "implicit" links between items, instead of or in addition to the explicit links. After identifying the implicit links between items, the implicit links may be used as the basis for generating quality measures for the items to which the implicit links point. A variety of types of implicit links are described. To facilitate the generation of quality measures for items based on implicit links, a graph of the implicit links may be constructed in a manner similar to a webgraph.

44 Claims, 3 Drawing Sheets

U.S. PATENT DOCUMENTS

| | | |
|---|---|---|
| 2002/0061022 A1 | 5/2002 | Allen et al. |
| 2002/0143933 A1 | 10/2002 | Hind et al. |
| 2003/0002436 A1 | 1/2003 | Anderson et al. |
| 2003/0033279 A1 | 2/2003 | Gibson et al. |
| 2003/0105744 A1 | 6/2003 | McKeeth |
| 2003/0204502 A1 | 10/2003 | Tomlin et al. |
| 2004/0002988 A1 | 1/2004 | Seshadri et al. |
| 2004/0143600 A1 | 7/2004 | Musgrove et al. |
| 2004/0199445 A1 | 10/2004 | Eder |
| 2005/0027699 A1* | 2/2005 | Awadallah et al. ............... 707/3 |
| 2005/0033745 A1 | 2/2005 | Wiener et al. |
| 2005/0071465 A1* | 3/2005 | Zeng et al. .................... 709/224 |
| 2005/0071741 A1* | 3/2005 | Acharya et al. ............... 715/500 |
| 2005/0210008 A1 | 9/2005 | Tran et al. |
| 2005/0216443 A1 | 9/2005 | Morton et al. |
| 2005/0243850 A1 | 11/2005 | Bass et al. |
| 2005/0251468 A1 | 11/2005 | Eder |
| 2005/0288954 A1 | 12/2005 | McCarthy et al. |
| 2006/0064411 A1* | 3/2006 | Gross et al. ....................... 707/3 |
| 2006/0085248 A1 | 4/2006 | Arnett et al. |
| 2006/0085391 A1 | 4/2006 | Turski et al. |
| 2006/0218010 A1 | 9/2006 | Michon et al. |
| 2006/0248035 A1* | 11/2006 | Gendler et al. ................... 707/1 |
| 2007/0078846 A1* | 4/2007 | Gulli et al. ......................... 707/5 |
| 2007/0112730 A1* | 5/2007 | Gulli et al. ......................... 707/3 |
| 2008/0306934 A1* | 12/2008 | Craswell et al. .................. 707/5 |
| 2008/0313119 A1* | 12/2008 | Leskovec et al. ............... 706/46 |
| 2008/0313247 A1* | 12/2008 | Galvin .......................... 708/200 |

OTHER PUBLICATIONS

"Finding Replicated Web Collections," by Cho et al, In: ACM SIGMOD Record, vol. 29, issue 2 (Jun. 2000), pp. 355-366. Available at http://portal.acm.org/citation.cfm?id=335191.335429 Last visited: May 29, 2009.*

"A Comparison of Implicit and Explicit Links for Web Page Classification," by Shen et al, In: International World Wide Web Conference Proceedings of the 15th International Conference on World Wide Web, Edinburgh Scotland (May 2006). Available at ACM.*

"Visualizing Individual Differences in Web Navigation: STRATDYN, a Tool for Analyzing Navigation Patterns," by Berendt and Brenstein. In: Behavior Research Methods, Instruments and Computers, 33(2) pp. 243-257 (2001). Available at: http://brm.psychonomic-journals.org/content/33/2/243.abstract Last visited: Aug. 14, 2010.*

"Optimizing Web Search Using Web Click-Through Data," by Xue et al. In: Proceedings of the Thirteenth ACM Int'l Conf. on INformation and Knowledge Mgt, pp. 118-126 (2004). Available at: ACM.*

"Case Study: E-Commerce Clickstream Visualization," by Brainerd and Becker. In: Information Visualization, pp. 153-156 (2001). Available at: IEEE Xplore.*

"Implicit Link Analysis for Small Web Search," by Xue et al. In: Proceedings of the 26th annual international ACM SIGIR conference on Research and development in informaion retrieval (2003). Available at: ACM.*

Mishra, R. et al., "KhjoYantra: An Integrated MetaSearch Engine with Classification, Clustering and Ranking" 2000 IEEE (pp. 122-131).

Varlamis, I. et al., "THESUS, a Closer View on Web Content Management Enhanced with Link Semantics" 2004 IEEE (pp. 685-700).

Office Action received in International application No. 20058003229.1 with English translation, dated Apr. 24, 2009 (11 pages).

Current claims in International application No. 20058003229.1, Jun. 2009 (5 pages).

"Communication pursuant to Article 94(3) EPC" received in International application No. 05 821 001.4-2201 dated Sep. 7, 2009 (6 pages).

Current Claims of International application No. 05 821 001.4-2201, Oct. 2009 (2 pages).

Gyongyi, Z. et al., "Combating Web Spam with TrustRank" XP-002366338 dated Mar. 1, 2004 (22 pages).

Rejection Decision received in Chinese Application No. 20058003229.1 dated Oct. 23, 2009 (11 pages).

Current Claims of Chinese Application No. 20058003229.1 dated Sep. 4, 2009 (6 pages).

State Intellectual Property Office of China, Notice of Registration in application No. 200580037229.1, dated Dec. 20, 2011, 5 pages.

Current Claims in Application No. 200580037229.1, dated Dec. 2011, 4 pages.

Japanese Office Action received in Application No. 539077/2007, Applicant: Yahoo, Dated Feb. 17, 2011 (2 pages).

Japanese Current Claims of Application No. 539077/2007, (3 pages).

Gyongyi, Zoltan, "Combating Web Spam with TrustRank", Proceedings of the 30$^{th}$ VLDB Conference, Mar. 11, 2004, pp. 576-587.

Mansanori Harada, "Ranking of the Search Results by a Search Engine, Bit", vol. 32, No. 8 Japan, Kyoritsu Shuppan Co. Ltd, Aug. 2000, No. 8, pp. 8-14.

Japan Office Action received in application No. 2007-539077, Applicant: Yahoo Inc., Dated Aug. 29, 2011, 2 pages.

Current Claims in application 2007-539077, Applicant: Yahoo Inc., Dated Aug. 2011, 3 pages.

Notice of Preliminary Rejections in application 10-2007-7011999, Applicant: Yahoo Inc., Dated Oct. 21, 2011, 1 page.

Current Claims for application 10-2007-7011999, Applicant: Yahoo Inc., Dates Oct. 2011, 4 pages.

* cited by examiner

DETERMINING QUALITY MEASURES FOR WEB OBJECTS BASED ON SEARCHER BEHAVIOR

RELATED APPLICATIONS

The present application is related to the following applications, each of which is incorporated herein by reference, as if fully set forth herein:

U.S. patent application Ser. No. 10/124,509 filed Apr. 16, 2002 entitled "USING NETWORK TRAFFIC LOGS FOR SEARCH ENHANCEMENT";

U.S. patent application Ser. No. 11/198,471 filed Aug. 4, 2005 entitled "LINK-BASED SPAM DETECTION"; and U.S. patent application Ser. No. 10/788,537 filed Feb. 26, 2004 entitled "ASSOCIATING PRODUCT OFFERINGS WITH PRODUCT ABSTRACTIONS".

FIELD OF THE INVENTION

The present invention relates to determining quality measures for web objects based on searcher behavior.

BACKGROUND

Typically, search engines order search results prior to presenting the search results to a user. The order usually takes the form of a "relevance ranking", where the matching item with the highest relevance ranking is the item considered most likely to satisfy the interest reflected in the search criteria specified by the user.

The specific techniques for determining relevance ranking vary from implementation to implementation. One factor used by many ranking mechanisms to determine relevance is the "quality" of a web page. When all other factors are equal, pages that are "popular" are given higher rankings than pages that are visited less frequently.

Ranking mechanisms may determine the quality of web pages based on information collected by the search engine. For example, one type of information that can be collected by the search engine is how users use the search engine. Thus, if users of the search engine frequently select a particular link from the search results, then the quality weight of the corresponding page may go up, therefore giving the page a higher relevance ranking.

Ranking mechanisms may also determine quality of web pages based on hyperlink relationships between web pages. One technique that uses hyperlink relationships to establish a measure of quality is known as the PageRank technique.

The PageRank Technique

The first Internet search engines were relatively simple systems based solely on matching query terms with web page keywords and content. These systems did not incorporate any model of user behavior into the search results, and thus had no way to determine user based quality measures of web pages.

A revolution in Internet search resulted from the adoption by Internet search engines of the PageRank technique. One implementation of the PageRank technique is described in U.S. Pat. No. 6,285,999. The PageRank technique determines how "popular" a web page is based on how much time a random surfer would spend on the web page. The more time a random surfer would spend on a web page, the more popular the web page was considered to be.

In the PageRank technique, a simplistic user behavior model is used to predict the amount of time a random surfer would spend on a web page. The user behavior model used by the PageRank technique is referred to herein as the "PageRank model". In the PageRank model, a random surfer starts at a random page on the Internet, follows hyperlinks randomly page to page and, after some time, randomly jumps to a new starting page.

Based on the PageRank model, the amount of time a random surfer spends on a web page (and therefore the quality measure of the web page) is dictated by purely structural properties of the web. Intuitively, it is related to hyperlinks and paths that will lead the random surfer from a random web page to the web page. In general, the more hyperlinks that point to a web page, and the greater the quality measure of the web pages that have those hyperlinks, the greater the quality measure of the web page.

Webgraph

Search engines that use the PageRank model may create a "webgraph" of the web pages that they index to facilitate the calculation of PageRank scores for those web pages. A webgraph is a graph in which nodes represent web pages, and edges between nodes represent hyperlinks between web pages. The edges of a webgraph are "directed". That is, each edge represents a hyperlink and points from the node that represents the web page that contains the hyperlink to the node that represents the web page pointed to by the hyperlink. For example, if a web page A has a hyperlink that points to a web page B, then the edge for that hyperlink would extend from the node that represents web page A to the node that represents web page B.

The quality values that are generated based on the PageRank technique using a webgraph are only as good as the PageRank model itself. Thus, if Internet users cease to behave like the random searcher portrayed by the PageRank model, the quality values produced by the PageRank technique will not accurately reflect how much time Internet users are spending on web pages.

Since the perceived value of a search engine is highly dependent on the accuracy of its relevance rankings, and relevance rankings are often based on quality measures, it is clearly desirable to provide techniques for increasing the accuracy of the quality measures.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

Techniques are described hereafter for generating quality measures for items, including web pages, based on a "random searcher" behavior model. The random searcher behavior model takes into account "implicit" links between items, instead of or in addition to the explicit links (static hyperlinks). After identifying the implicit links between items, the implicit links may be used as the basis for generating quality measures for the items to which the implicit links point in a manner similar to how explicit links are used in the PageRank technique. A variety of types of implicit links are described in greater detail hereafter.

To facilitate the generation of quality measures for items based on implicit links, a graph of the implicit links may be constructed in a manner similar to a webgraph. Alternatively, a webgraph may be augmented by adding to the webgraph edges that correspond to implicit links, and nodes that correspond to items, other than web pages, that may be the source and/or target of such implicit links. For example, in one embodiment, nodes representing search queries and/or sponsored results are added to a webgraph.

Figure 1:
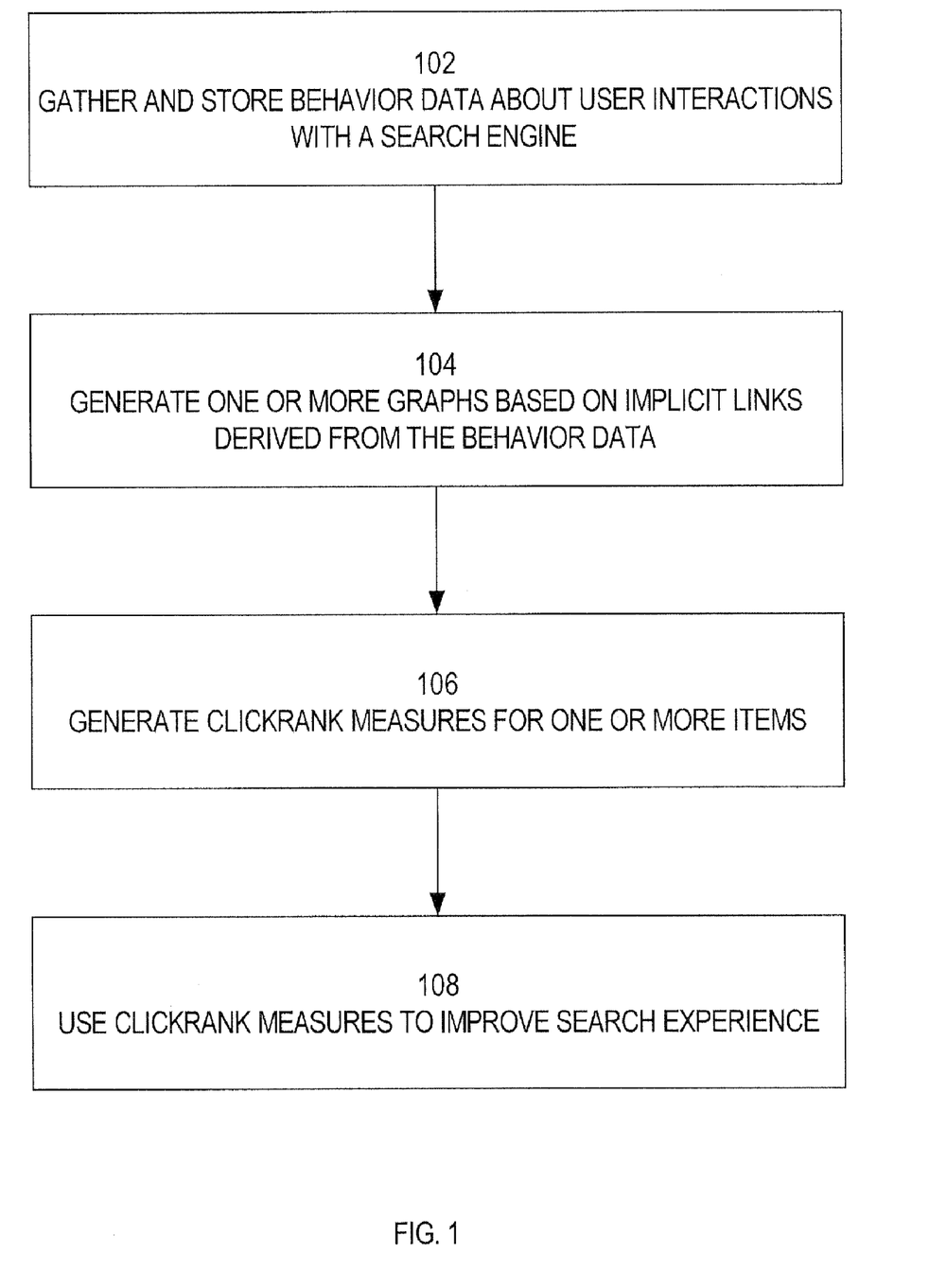
FIG. 1 is a flowchart illustrating high level steps for employing a random searcher model in a search engine system, according to an embodiment of the invention.

FIG. 1 is a block diagram that illustrates the general steps performed by a system that employs the techniques described hereafter, according to an embodiment of the invention. Referring to FIG. 1, at step 102 a monitoring mechanism gathers and stores behavior data about user interactions with a search engine, including queries and clicks on links to items (web pages and sponsored results) in search result listings. At step 104, a graph construction mechanism generates one or more graphs based on implicit links derived from the stored behavior data. At step 106, a ClickRank determination mechanism generates ClickRank measures for one or more items based on the one or more graphs. At step 108, the search engine uses the ClickRank measures to improve one or more aspects of the search experience. Various aspects that may be improved based on ClickRank measures are described in greater detail hereafter.

The Random Searcher Model

Contrary to the random surfer model, the random searcher model assumes that search engine users frequently re-visit the search portal as a base of their actions. Specifically, the searcher repeats the following process: make a query; follow a number of displayed hyperlinks listed on the result page; and perhaps surf.

In addition, whereas the random surfer randomly (and uniformly) walks along hyperlinks and randomly (and uniformly) jumps to pages in the webgraph, the random searcher behavior better mimics real users by revisiting the search portal and making queries and clicks according to real user statistics.

The search portal, in turn, includes a monitoring mechanism that maintains measurements of the query distribution and of click statistics of each search. The search engine may then use this information to integrate relevance information into a ranking function. Thus, click behavior is explicitly built into the random searcher model.

Augmented Webgraph and ClickRank

In order to fully model a random searcher's behavior, a webgraph is augmented with additional nodes and edges. The information with which the webgraph is augmented depends on what types of web objects are to be represented within the model, and what type of behavior activity is considered to constitute an implicit link. The web objects that are represented in the model may, for example, be anything, on a search page, that a user can click on (e.g. media objects, sponsored results, etc.).

For example, in a model that incorporates sponsored results, the webgraph may be augmented to include nodes that represent queries, search results and sponsored results, in addition to web pages. Further, edges are added to represent (as implicit links) various kinds of user movement in addition to traversal of hyperlinks. Using the new model of user behavior and the modified graph representation of the web, a new quality measure (referred to herein as "ClickRank") is generated. The ClickRank measure indicates the relative amount of time the random searcher spends not only on each web page, but also how much time he spends on each query and each sponsored result.

As with PageRank, ClickRank can be used to improve web search. However, unlike PageRank, ClickRank provides a quality measure for queries and for sponsored results in addition to web pages. Therefore, ClickRank can be used to improve sponsored result ranking for web search.

Definitions

Hyperlink. A link between two web pages that points from one to the other. In general, hyperlinks may be treated as properties of the web pages, and are static.

Weighted directed graph. A graph is a set of nodes, connected by edges. Edges are directed, pointing from a source node to a destination node. Edges carry weights, which are usually integers.

Webgraph. The graph where nodes correspond to webpages on the Internet and edges correspond to hyperlinks between the webpages is called the webgraph.

Web Search. A search over the webgraph.

Query. The terms used in a specific web search.

Search result. The web page resulting from a search query.

Sponsored Result. A paid advertisement to be shown on the search page results. Typically a sponsored result is displayed as a hyperlink and short description on top/bottom/right side of result page.

Web object. Any item that may be the source or target of a hyperlink or implicit link. In one embodiment, web objects include web pages, queries (or search results), and sponsored results.

Explicit link. A hyperlink.

Implicit link. An implicit link is any link between any two web objects other than hyperlinks.

PageRank, Random Walk, Eigenvector. The PageRank algorithm computes the stationary distribution of a random walk (with random restarts) over the webgraph. This computation is equivalent to computing the Eigenvector over a carefully constructed transition probability matrix. PageRank models the behavior or a "random surfer" over the webgraph.

Modeling User Search Behavior

According to one embodiment, behavior data that records search sessions are inspected to construct a model of user search behavior. A search session is a repeated process of queries followed by zero or more clicks on the search result page. A search session can be represented as an ordered list of queries and web objects. As an example, consider the session $(q_1, w_1, w_2, w_3, q_2, w_4, q_3, q_4, w_5, w_6)$ where $q_i$ represent the queries and $w_i$ represent web pages (or sponsored results) that the user has clicked on. In this session, the user made query $q_1$, clicked on web page $w_1$, followed by a click on web page $w_2$, followed by a click on web page $w_3$, followed by a second query $q_2$, and so on. To represent the user behavior, implicit links are established between the web objects (the qi and wi above) that the random searcher visits during his session.

Types of Implicit Links

Figure 2:
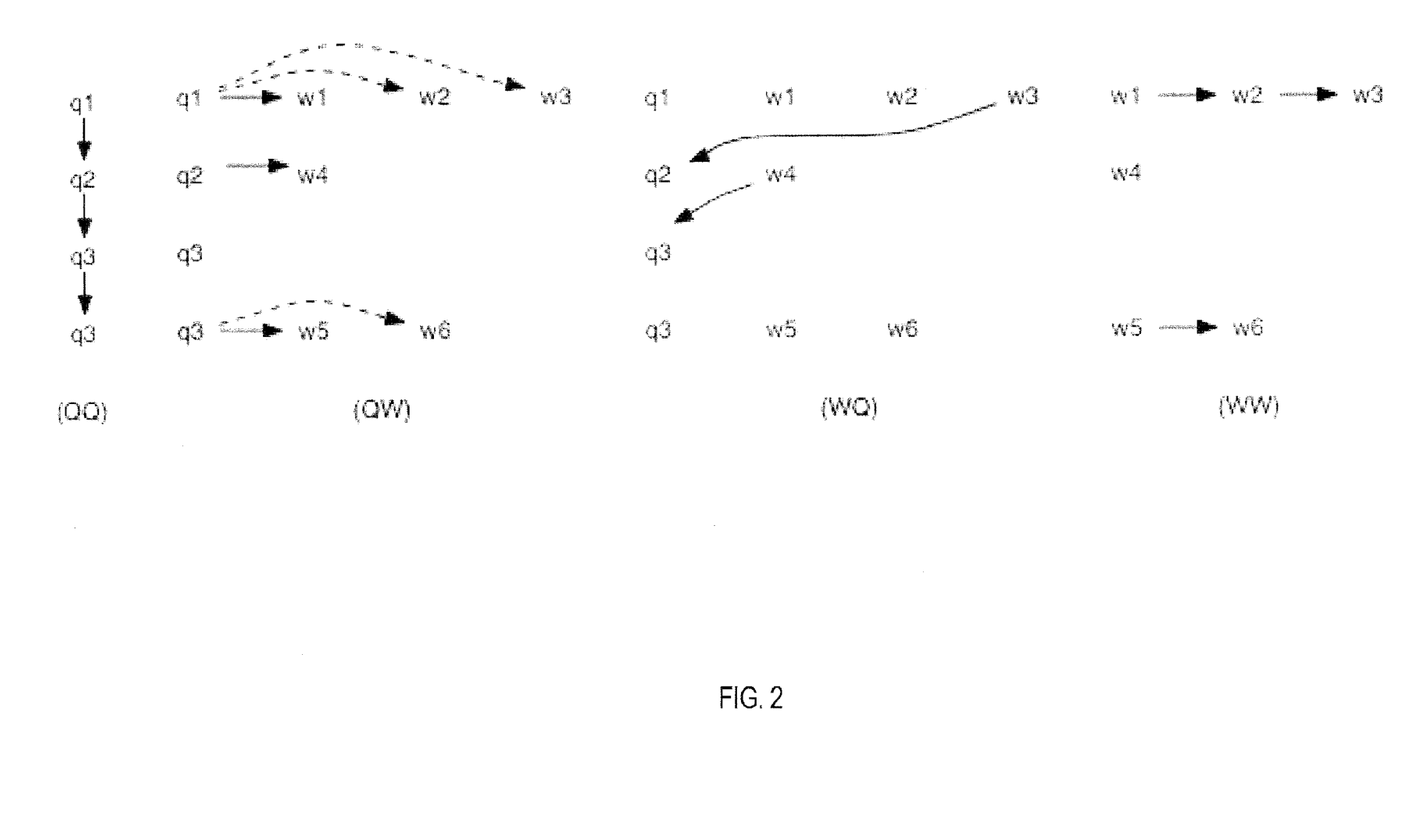
FIG. 2 is a block diagram illustrating types of implicit links that may be established from captured user behavior, according to an embodiment of the invention.

According to one embodiment, various types of implicit links are created based on the session information captured from search engine users. FIG. 2 illustrates four types of implicit links created based on the session ($q_1$, $w_1$, $w_2$, $w_3$, $q_2$, $w_4$, $q_3$, $q_4$, $w_5$, $w_6$). The four types of implicit links include implicit query-to-query links (QQ links), implicit query-to-web-page links (QW) links, implicit web-page-to-query links (WQ links), and implicit web-page-to-web-page links (WW links). Each type of implicit link models a different aspect of user behavior.

Referring to FIG. 2, it illustrates four graphs QQ, QW, WQ and WW. The edges of the QQ, QW, WQ and WW graphs are respectively referred to as QQ, QW, WQ and WW edges. According to one embodiment, The QQ, QW, WQ and WW edges are defined as follows:
1. QQ edges—($q_i$, $q_j$) is an edge from query $q_i$ to query $q_j$ where $q_i$ is made before $q_j$ in a single session or by a single user (possibly over multiple sessions).
2. QW edges—(q,w) is an edge from query q to web page w if web page w in the search results was clicked on after a user made query q.
3. WW edges—($w_i$,$w_j$) is an edge from web page $w_i$ to web page $w_j$ if $w_i$ and $w_j$ both occur as results from a single query and $w_i$ was clicked on before $w_j$.
4. WQ edges—(w,q) is an edge from web page w to query q if web page w was the web page clicked on just before query q was made (i.e. w was in the previous query search results).

It should be noted that implicit WW links are quite different from explicit links between web pages. Specifically, there may be an implicit WW link from one web page to another without there being any explicit link between the two pages. Conversely, even though two pages have one or more explicit links to each other, there may not be any implicit WW link between them.

Sponsored Results

Sponsored results are web objects that are intended for inclusion in search results. Frequently, sponsored results do not have any permanent address or location. For example, sponsored results may be dynamically generated in response to selection of links on a search result web page. Because sponsored results have no permanent address, other web pages will not have hyperlinks to sponsored results. Consequently, the random surfer would never visit sponsored results. In fact, sponsored results would not even be represented in a webgraph. Therefore, the PageRank technique cannot be used to generate quality measures for sponsored results.

In contrast, sponsored results can be the target of some of the implicit links identified above. For example, a sponsored result becomes the target of a QW link when a searcher clicks on a link, within the search result page of a query, to the sponsored result. Similarly, a sponsored result becomes the target of a WW link when a user clicks on a search result link to a web page, and then clicks on a search result link to the sponsored result. Because sponsored results can be the target of implicit links, a quality measure may be calculated for sponsored results based on incoming implicit links. Graphs that include nodes for sponsored results, and which link the sponsored results nodes to other nodes by edges that represent implicit links, shall be described in greater detail hereafter.

Sponsored results are merely examples of web objects that (a) are not targets of static hyperlinks on web pages, but (b) can be targets of implicit links derived from captured user behavior data. Other examples include media objects, such as videos, images, etc. that may be included in search results web pages. When a user selects, plays, or otherwise activates such media objects on a search results page, implicit QW links to the media objects may be created from the query to the media object, and implicit WW links to the media objects may be created from previously visited web objects in the search results.

For example, in the context of image search, a search results page may include five images i1, i2, i3, i4 and i5. Assume that, during a session, a user clicks on i1, then returns to the search results, and then clicks on i4. In response to this user behavior, implicit links would be established from the search query to i1, from the search query to i4, and from i1 to i4. A graph that contains nodes for queries and images, and edges for such implicit links, may be used to generate link-based quality measures for images in a manner similar to how a webgraph is used to generate link-based quality measures for web pages.

Modified Webgraphs

Based on the implicit links described above, various modified webgraphs can be constructed to better model user behavior. Similar to the conventional webgraph used by PageRank, each modified webgraph G=(V,E) is made up of nodes V and edges E. However, while the PageRank technique uses a webgraph where V=W is the set of web pages W, and E is composed of the hyperlinks that point from web page to web page, the modified webgraphs incorporate implicit links derived from user behavior.

The specific user behavior that establishes implicit links between objects may vary from implementation to implementation. For example, an implicit link may be established between a web page and a "product" when a user clicks on an advertisement, within the web page, for the product. Alternatively, an implicit link may be established between a web page and a product when a user clicks on the advisement and actually completes a purchase of the product. There is virtually no limit to the type of human behavior that may be used to establish implicit links. Consequently, there is virtually no limit to the type of modified webgraphs that can be generated using implicit links derived from user behavior.

Various specific modified graphs shall be described hereafter for the purpose of illustration. However, the techniques described herein are not limited to any particular type or set of modified graphs. For example, one modified graph that may be used by an embodiment of the invention is referred to herein as the Web-Query-Click Graph.

Web-Query-Click Graph $G_1$ (V=Q+W, E=QW):

The Web-Query-Click Graph incorporates queries and click behavior by adding nodes, Q, representing queries (or web search results). These graphs do not distinguish between the actual query and the search result page. Then, for each query q, the user may click on one or more results from the search results. As in FIG. 1 (QW), for each such (q,w) pair the graph construction mechanism adds an edge to E (and allow repeated edges rather than explicitly giving weights to the edges).

Another modified graph that may be used by an embodiment of the invention is referred to herein as the Web-Query-Click-Sponsored Graph.

Web-Query-Click-Sponsored Graph $G_2$ (V=Q+W+SR, E=QW)

The Web-Query-Click-Sponsored Graph may be constructed based on the Web-Query-Click Graph. Specifically, the graph construction mechanism may construct the Web-Query-Click-Sponsored Graph by adding to $G_1$ nodes that represent sponsored results (i.e. advertisements) that appear on the page. Each sponsored result is in fact a web page (it contains content and hyperlinks to other web pages). However, because each sponsored result is created only for the search engine, a sponsored result is a page with no incoming explicit links. The graph construction mechanism adds edges to E that represent links from query q to sponsored result s in SR, the set of all sponsored result pages (FIG. 1 (QW) where sponsored results are represented by web pages w.).

Another modified graph that may be used by an embodiment of the invention is referred to herein as the Web-Query-Click-Sponsored sequential graph.

Web-Query-Click-Sponsored Sequential Graph $G_3$ (V=W+Q+SR, E=QW$^0$+WW)

The Web-Query-Click-Sponsored sequential graph is a graph built from implicit QW and WW links, where implicit links from web page to web page (WW) are added to links from the query to the first web page clicked on (QW$^0$). Web-Query-Click-Sponsored sequential graph models the sequential nature of the user session. The Web-Query-Click-Sponsored sequential graph will model the flow from query to query in the order they were clicked on.

Another modified graph that may be used by an embodiment of the invention is referred to herein as the Web-Query-Click-Sponsored Total graph 1.

Web-Query-Click-Sponsored Total Graph 1 $G_4$ (V=W+Q+SR, E=QW$^0$+WW+QQ)

The Web-Query-Click-Sponsored Total graph 1 models the total sequence that users traverse. To construct the Web-Query-Click-Sponsored Total graph 1, the graph construction mechanism includes the entire path of known searches and clicks. Thus, a 'total' graph can be built from FIG. 1 (QW, WW,QQ), where QQ chains sequential queries together.

Another modified graph that may be used by an embodiment of the invention is referred to herein as the Web-Query-Click-Sponsored Total graph 2.

Web-Query-Click-Sponsored Total Graph 2 $G_5$ (V=W+Q+SR, E=QW$^0$+WW+QQ+WQ)

Web-Query-Click-Sponsored Total graph 2 is similar to $G_4$, but augmented by adding chaining from the last known web click to the current web query (WQ). In this way, the item ClickRank determination mechanism is able to more accurately trace the true path through the web (queries, sponsored results, and web pages) performed by a web searcher.

Another modified graph that may be used by an embodiment of the invention is referred to herein as the Query Graph.

Query-Graph $G_6$ (V=Q, E=QQ)

To model the searches performed by users, the Query Graph models only the searches and how the searches link together.

Each of the above modified web graphs contains only a portion of the conventional webgraph since they do not contain all hyperlinks H. In addition to each of the above modified graphs, the ClickRank determination mechanism can consider graphs that include the webgraph hyperlinks by creating for each $G_X$ (X=1.6) above, $GH_X$=(VH$_X$=V$_X$+W, EH$_X$=E$_X$+H) from $G_X$=(V$_X$, E$_X$).

The graphs without the hyperlink information give a much more compact representation of user behavior focused only on that part of the graph that is observed from the search engine, whereas the graphs with hyperlink information give a more complete picture of general user behavior, assuming that the "random searcher" transforms to the random surfer once he enters the hyperlinked domain.

Modeling the Random Searcher—Computing ClickRank

As explained above, the PageRank technique models the random surfer—which is a user who randomly follows hyperlinks from web page to web page and periodically restarts at a random page on the internet. In contrast, the random searcher is a user who randomly makes a query to a search engine, and randomly follows links according to the structure of the graph created using the implicit links above and periodically restarts at a random query.

As with PageRank, the ClickRank determination mechanism measures quality of a web object as the fraction of time a random searcher spends on that web object. In one embodiment, the ClickRank determination mechanism simply uses the PageRank calculation technique on augmented/modified webgraphs to generate ClickRank measures for web objects. In such an embodiment, the basic steps to calculating ClickRank are simply: (1) Construct the appropriate graph G, and (2) Run PageRank on G. In running the PageRank algorithm on G, nodes that represent queries/search results pages may be used as the "seed" pages from which graph traversals are initiated. The initial quality of such query nodes may be established based on how frequently the corresponding search queries were submitted by users (as indicated in the behavior data generated by the search engine).

Edge Weights

According to one embodiment, not all implicit edges are given the same "weight" for the purposes of determining the quality of the target web object. In general, the more frequently the behavior data establishes an implicit link between two web objects, the greater the weight of the edge that represents the implicit link.

Adding weights to edges is sufficient to deal with weighing certain nodes as well. A noteworthy case occurs when encoding user query statistics into the web graph. At first, the user query nodes should be weighed. However, this node weight can easily accomplished by adding implicit edges from a source web page (e.g. 'search.yahoo.com') to the query nodes and weighing the edges from the source web page node to the query nodes.

For example, assume that only one user has selected sponsored result SR1 from the search results page for query Q1. During the same time period, thousands of users may have selected sponsored result SR2 from the search results page for the same query Q1. Under these circumstances, QW links would exist from Q1 to both SR1 and SR2. However, the QW edge to SR2 would have a much greater weight than the QW edge to SR1.

How weights for edges are derived may vary from implementation to implementation. For example, the weight for a QW edge from a particular query to a particular web object may be based, at least in part, on the total number of times users clicked on the particular web object in the result page for the particular query. Alternatively, the weight for a QW edge from a particular query to a particular web object may be based, at least in part, on the percentage of times users clicked on the particular web object when presented with the result page for the particular query.

There are many variations of weighting schemes that can be integrated into the ClickRank algorithm as a way to deal with noisy data and under-sampled data. Examples include: normalization of click statistics based on expected clicks by position or page; normalization of click statistics to click distributions; and truncating (smoothing) statistics to avoid overemphasis of certain statistics.

Using ClickRank Measures

ClickRank measures have many applications in the web search domain. For example, ClickRank measures may be used to improve search results and/or improve content matching performed by search engines.

With respect to improving searches, using ClickRank measures can improve the web search quality because ClickRank measures give a more accurate model of user preference than PageRank. Specifically, ClickRank can be one factor of an overall scoring function that orders web page results to individual features. One approach is to use machine learning to develop such a function using ClickRank measures as one among many possible input features.

Biasing the relevance ranking on ClickRank measures is believed to provide better ranking then conventional ranking techniques because ClickRank measures directly isolate those pages that are likely to be clicked on by simultaneously promoting these pages and demoting less likely clicked on pages, thus minimizing time for the searcher to find pages of interest.

With respect to improved content match, ranking advertisements to show with a given search results page can benefit from ClickRank measures because ClickRank provides a way to judge the intrinsic quality of each advertisement. Specifically, sponsored advertisements have little or no explicit link structure, and therefore PageRank cannot be used directly. ClickRank allows for query and click information to be combined with the web structure to give a measure of sponsored result relevance. In some sense, ClickRank measures indicate how likely the random searcher is to click on the advertisement in general. When combined with the content on the page, ClickRank measures can be used as one feature among many to determine the display order of advertisements.

Hardware Overview

Figure 3:
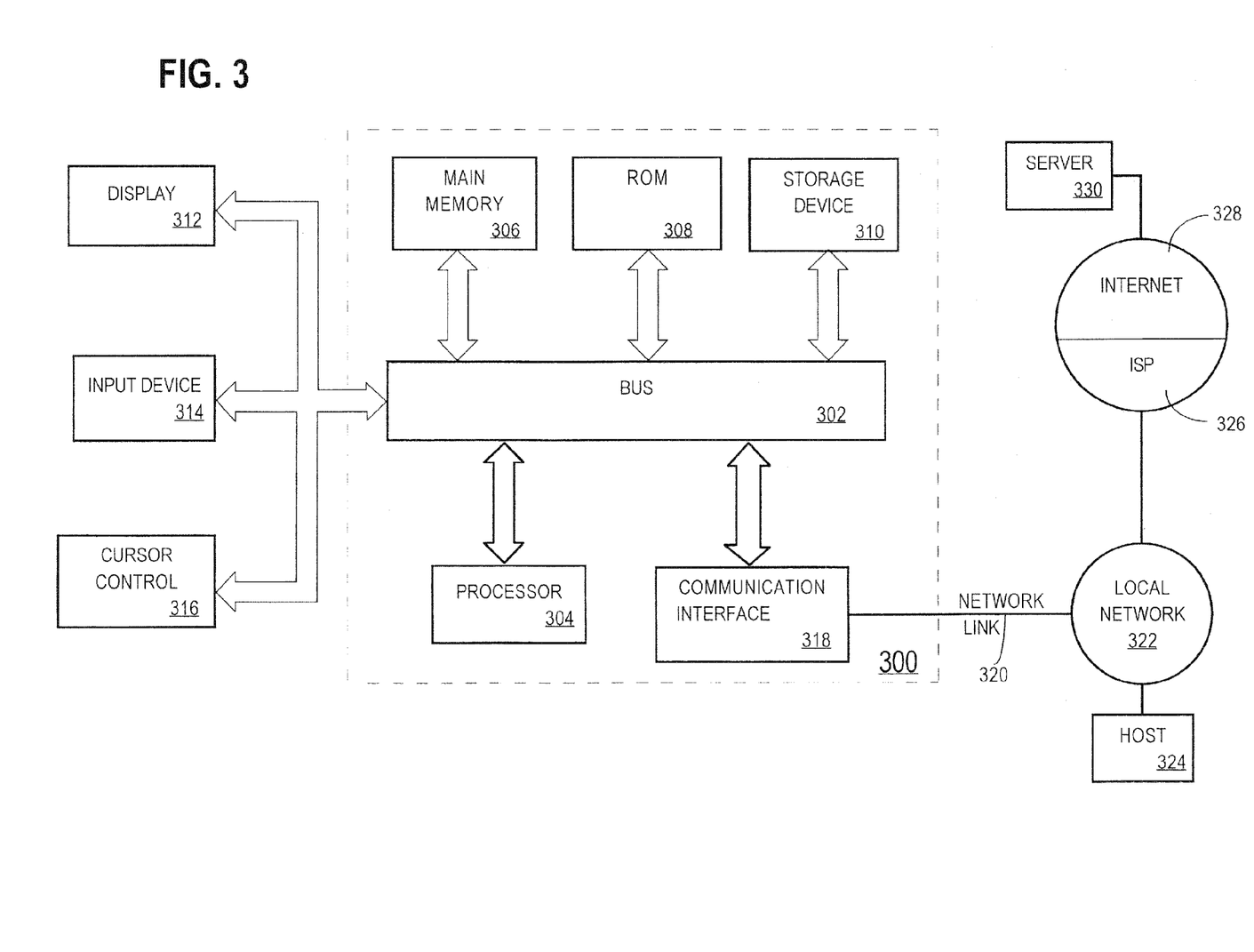
FIG. 3 is a block diagram of a computer system upon which embodiments of the invention may be implemented.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 300, various machine-readable media are involved, for example, in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for measuring quality of web objects, the method comprising the computer-implemented steps of:
    storing behavior data based on how users interact with a search engine;
    generating one or more graphs that include nodes that represent web objects;
    wherein at least some edges within said one or more graphs represent implicit links derived from said behavior data;
    wherein at least one implicit link, of said implicit links, is represented in said one or more graphs by an edge from a first node, which represents a first web object, to a second node that represents a first query, wherein said first web object was clicked on before said first query was made; and
    for each web object in a set of web objects that are represented by nodes in said one or more graphs, generating a quality measure for said each web object based on edges within said one or more graphs that lead to the node that represents said each web object, wherein the quality measure is based at least in part, on how much time users spend viewing the web objects;
    wherein generating said quality measure for said each web object in the set of web objects includes generating at least one measure based on said edge that represents said at least one implicit link within said one or more graphs;
    wherein the method is performed by one or more computing devices.

2. The method of claim 1 wherein the web objects that are represented by the nodes in the one or more graphs include items that (a) appear on search results pages presented by the search engine, and (b) can be clicked on by a user.

3. The method of claim 1 further comprising using said quality measures to improve search results generated by said search engine.

4. The method of claim 1 further comprising using said quality measures to improve content matching performed by said search engine.

5. The method of claim 1 wherein:
    at least some nodes of the one or more graphs represent queries submitted to the search engine; and
    the implicit links include at least one implicit link that is established from a first query to a second query in response to determining, from the behavior data, that a user submitted the second query after submitting the first query.

6. The method of claim 1 wherein:
    at least some nodes of the one or more graphs represent queries submitted to the search engine; and
    the implicit links include at least one implicit link that is established from a query to a web object in response to a determining, from the behavior data, that a user clicked on a link to the web object that was presented in search results provided by the search engine for the query.

7. The method of claim 1 wherein:
    the implicit links include at least one implicit link that is established from a first web object to a second web object in response to a determining, from the behavior data, that a user:
        clicked on a first link to the first web object, and then clicked on a second link to the second web object;
    both the first link and the second link were presented to the user in a search results page for a particular query submitted to the search engine.

8. The method of claim 1 wherein:
    at least some nodes of the one or more graphs represent queries submitted to the search engine;
    the implicit links include at least one implicit link that is established from a web object to a particular query in response to a determining, from the behavior data, that a user submitted the particular query after the user clicked on a link to the web object; and
    the link to the web object was presented in search results provided by the search engine for another query that the user submitted to the search engine before said particular query.

9. The method of claim 1 wherein said one or more graphs include a web-query-click graph.

10. The method of claim 1 wherein said one or more graphs include a web-query-click-sponsored graph.

11. The method of claim 1 wherein:
said set of web objects includes a particular web page;
a particular web object is a web object that is generated for inclusion in search results;
said particular web page is a web object to which no other web page explicitly points; and
the implicit links include at least one implicit link from another web object to said particular web object.

12. The method of claim 11 wherein said at least one implicit link is generated in response to determining, from the behavior data, that a user selecting a link to said web object that was presented in search results for a particular query.

13. The method of claim 1 wherein said one or more graphs include a web-query-click-sponsored sequential graph.

14. The method of claim 1 wherein said one or more graphs include a graph with edges that reflect entire paths of searches and clicks that are recorded in said behavior data.

15. The method of claim 14 wherein said graph also includes edges that reflect implicit links (a) from nodes that represent web objects that were visited by users (b) to nodes that represent searches submitted by the users immediately after visiting said web objects.

16. The method of claim 1 wherein said one or more graphs include a query graph.

17. The method of claim 1 wherein said one or more graphs include a graph that includes both edges that correspond to implicit links, and edges that correspond to explicit links.

18. The method of claim 1 further comprising determining how to rank search results that include web objects based, at least in part, on said quality measures generated for said web objects.

19. The method of claim 18 wherein the step of determining how to rank search results includes determining how to rank one or more of sponsored results, images, or media.

20. The method of claim 1 wherein:
said set of web objects includes sponsored results; and
the method comprises determining which sponsored results to include with search results based, at least in part, on said quality measures generated for said sponsored results.

21. The method of claim 1 wherein the set of web objects includes queries submitted to the search engine.

22. A machine-readable storage medium carrying one or more sequences of instructions which, when executed by one or more processors, causes the one or more processors to perform the method recited in claim 1.

23. A machine-readable storage medium carrying one or more sequences of instructions which, when executed by one or more processors, causes the one or more processors to perform the method recited in claim 2.

24. A machine-readable storage medium carrying one or more sequences of instructions which, when executed by one or more processors, causes the one or more processors to perform the method recited in claim 3.

25. A machine-readable storage medium carrying one or more sequences of instructions which, when executed by one or more processors, causes the one or more processors to perform the method recited in claim 4.

26. A machine-readable storage medium carrying one or more sequences of instructions which, when executed by one or more processors, causes the one or more processors to perform the method recited in claim 5.

27. A machine-readable storage medium carrying one or more sequences of instructions which, when executed by one or more processors, causes the one or more processors to perform the method recited in claim 6.

28. A machine-readable storage medium carrying one or more sequences of instructions which, when executed by one or more processors, causes the one or more processors to perform the method recited in claim 7.

29. A machine-readable storage medium carrying one or more sequences of instructions which, when executed by one or more processors, causes the one or more processors to perform the method recited in claim 8.

30. A machine-readable storage medium carrying one or more sequences of instructions which, when executed by one or more processors, causes the one or more processors to perform the method recited in claim 9.

31. A machine-readable storage medium carrying one or more sequences of instructions which, when executed by one or more processors, causes the one or more processors to perform the method recited in claim 10.

32. A machine-readable storage medium carrying one or more sequences of instructions which, when executed by one or more processors, causes the one or more processors to perform the method recited in claim 11.

33. A machine-readable storage medium carrying one or more sequences of instructions which, when executed by one or more processors, causes the one or more processors to perform the method recited in claim 12.

34. A machine-readable storage medium carrying one or more sequences of instructions which, when executed by one or more processors, causes the one or more processors to perform the method recited in claim 13.

35. A machine-readable storage medium carrying one or more sequences of instructions which, when executed by one or more processors, causes the one or more processors to perform the method recited in claim 14.

36. A machine-readable storage medium carrying one or more sequences of instructions which, when executed by one or more processors, causes the one or more processors to perform the method recited in claim 15.

37. A machine-readable storage medium carrying one or more sequences of instructions which, when executed by one or more processors, causes the one or more processors to perform the method recited in claim 16.

38. A machine-readable storage medium carrying one or more sequences of instructions which, when executed by one or more processors, causes the one or more processors to perform the method recited in claim 17.

39. A machine-readable storage medium carrying one or more sequences of instructions which, when executed by one or more processors, causes the one or more processors to perform the method recited in claim 18.

40. A machine-readable storage medium carrying one or more sequences of instructions which, when executed by one or more processors, causes the one or more processors to perform the method recited in claim 19.

41. A machine-readable storage medium carrying one or more sequences of instructions which, when executed by one or more processors, causes the one or more processors to perform the method recited in claim 20.

42. A machine-readable storage medium carrying one or more sequences of instructions which, when executed by one or more processors, causes the one or more processors to perform the method recited in claim 21.

43. The method of claim 1 wherein the first web object was in the previous query search results.

44. A machine-readable storage medium carrying one or more sequences of instructions which, when executed by one or more processors, causes the one or more processors to perform the method recited in claim 43.

* * * * *